(12) United States Patent
Hashimoto (10) Patent No.: US 7,915,906 B2
(45) Date of Patent: Mar. 29, 2011

(54) TEST CIRCUIT FOR LIQUID CRYSTAL DISPLAY DEVICE, LCD DEVICE INCLUDING TEST CIRCUIT, AND TESTING METHOD FOR LCD DEVICE

(75) Inventor: Kazuyuki Hashimoto, Tokyo (JP)

(73) Assignee: TPO Hong Kong Holding Limited, Shatin (HK)

( * ) Notice: Subject to any disclaimer, the term of this patent is extended or adjusted under 35 U.S.C. 154(b) by 805 days.

(21) Appl. No.: 11/920,388

(22) PCT Filed: May 9, 2006

(86) PCT No.: PCT/JP2006/309336
§ 371 (c)(1),
(2), (4) Date: Nov. 13, 2007

(87) PCT Pub. No.: WO2006/123553
PCT Pub. Date: Nov. 23, 2006

(65) Prior Publication Data
US 2009/0096728 A1   Apr. 16, 2009

(30) Foreign Application Priority Data
May 18, 2005   (JP) .................... 2005-145860

(51) Int. Cl.
*G01R 31/26* (2006.01)
(52) U.S. Cl. ................... 324/760.01; 345/87
(58) Field of Classification Search .......... None
See application file for complete search history.

(56) References Cited

U.S. PATENT DOCUMENTS

| | | | |
|---|---|---|---|
| 6,850,085 B2 * | 2/2005 | Sakaguchi et al. | 324/765 |
| 7,746,093 B2 * | 6/2010 | Cha | 324/770 |
| 2004/0217773 A1 * | 11/2004 | Nara et al. | 324/770 |
| 2005/0200377 A1 * | 9/2005 | Orii et al. | 324/770 |

FOREIGN PATENT DOCUMENTS

| JP | 07-199220 | 8/1995 |
|---|---|---|
| JP | 2000-047255 | 2/2000 |

OTHER PUBLICATIONS

PCT International Search Report of Counterpart PCT Application No. PCT/JP2006/309336.

* cited by examiner

*Primary Examiner* — Ha Tran T Nguyen
*Assistant Examiner* — Arleen M Vazquez
(74) *Attorney, Agent, or Firm* — Liu & Liu (57) ABSTRACT

A test device for detecting malfunction of a liquid crystal display device, and also provide a liquid crystal display device incorporated with such test device. The test device comprising a comparator circuit for detecting which of the rows or columns of the lines is selected, an encoder circuit receiving the detection result from the comparator circuit, a plurality of bus lines and a read-out circuit reading the voltage level of the bus lines from the encoder circuit to determine if the encoded number is identical with the number of the selected row or column line, wherein the comparator circuit, the encoder circuit, and the read-out circuit being built in the same substrate as the liquid crystal display elements.

16 Claims, 9 Drawing Sheets

TEST CIRCUIT FOR LIQUID CRYSTAL DISPLAY DEVICE, LCD DEVICE INCLUDING TEST CIRCUIT, AND TESTING METHOD FOR LCD DEVICE

BACKGROUND OF THE INVENTION

1. Field of Invention

The present invention relates to a liquid crystal display device test circuit, a liquid crystal device incorporated with the same, and a test method for the liquid crystal device.

2. Related Art

Among a variety of liquid crystal display devices, especially a thin film transistor (TFT) liquid crystal display device is comprised of liquid crystal display elements arranged in matrix on a glass substrate, thin film transistors (TFTs) having their respective drains connected to the liquid crystal display elements, row lines each of which is commonly connected to gates of the TFTs in a row and is controlled by a row driver, and column lines each of which is commonly connected to sources of the TFTs in a column and is controlled by a column driver to receive multi-level voltage depending upon gradation of an image to be displayed, and typically, the TFTs, the row lines, the column lines, and other components are built up through the amorphous silicon process technology.

In general, after these primary components of the liquid crystal display elements are formed, a process of attachment of color filter glass is followed by injecting liquid crystal to complete the device, and thereafter, the finished device undergoes a lighting-up test. During the lighting-up test, a row decoder activates a target row line to turn on the TFTs, gates of which are connected to the target row line. And voltages depending upon the brightness of an image to be displayed are applied by the column driver to the data (column) lines to which sources of the TFTs are connected. The voltages are supplied through the TFT to a pixel electrode connected to the drain of the TFT, and thus, the liquid crystal is varied in transmissivity to give the desired display. Pass or fail on the lighting-up test is judged by visual inspections.

In this way, since the lighting-up test is carried out on the device completely finished, it is a sheer waste of the device manufacturing process when some defects are observed after all.

On the other hand, the recent development of the low temperature poly silicon (LTPS) process technology has boosted up numbers of circuits implemented on an array glass, and the boosting popularity of much larger liquid crystal display devices in the market, as well, will probably cause an increase in a rejection rate of the products far beyond the current figure.

Considering these situations, an improvement is disclosed where, for the device before completion, in order to perform a test of an image display, signals from all the points to be inspected are taken out to peripheral parts of an array substrate provided with a numerous analog switches, and an external test signal is applied to the device so as to detect off leak malfunction (see Patent Document 1 listed below).

Patent Document 1: Japanese Patent Preliminary Publication No. 2001-330639.

Such a prior art, however, utilizes two Off level voltages and a way of increasing leak current to detect off leak malfunction, and a minute current variation due to the off leak malfunction cannot be assuredly detected by this embodiment. In addition, a numerous terminals and analog switches must be provided in the peripheral parts of the liquid crystal display device for the purpose of detecting the malfunction betray the desires of downsizing and reduction of the space.

SUMMARY OF THE INVENTION

Accordingly, it is an object of the present invention to provide a test circuit of a simplified structure capable of detecting malfunction of a liquid crystal display device, and also provide a liquid crystal display device incorporated with such a test circuit.

According to one aspect of the present invention, there is provided a test device for a liquid crystal display device in which a liquid crystal display unit has liquid crystal display elements arranged in matrix, and thin film transistors have their respective drains connected to the liquid crystal display elements, their respective gates commonly connected to row lines, and their respective sources commonly connected to column lines, the transistors arranged in the same row sharing the line of that row, the transistors arranged in the same column sharing the line of that column, the rows of the lines being controlled by a row driver, and the columns of the lines being supplied with multi-level voltage depending upon gradation of a display image by a column driver; the test device comprising:

a comparator circuit provided in each of either the rows or columns of the lines for detecting which of the rows or columns of the lines is selected, an encoder circuit receiving the detection result from the comparator circuit and scanning bi-directionally from head to tail or vice versa of the rows or columns of the lines to obtain the number of the selected row or column line, a plurality of bus lines constituting a bus being varied in voltage level depending upon the obtained number of the selected row or column line and encoding the voltage level in relation with the number, and a read-out circuit reading the voltage level of the bus lines from the encoder circuit to determine if the encoded number is identical with the number of the selected row or column line, said comparator circuit, said encoder circuit, and said read-out circuit being built in the same substrate as the liquid crystal display elements.

According second aspect of the invention, there is provided a liquid crystal display device, comprising a liquid crystal display unit including liquid crystal display elements arranged in matrix, thin film transistors having their respective drains connected to the liquid crystal display elements, row lines commonly connected to gates the thin film transistors, and column lines commonly connected to sources of the thin film transistors, the transistors arranged in the same row sharing the line of that row, the transistors arranged in the same column sharing the line of that column, the rows of the lines being controlled by a row driver, and the columns of the lines being supplied with multi-level voltage depending upon gradation of a display image by a column driver;

a comparator circuit provided in each of either the rows or columns of the lines for detecting which of the rows or columns of the lines is selected;

an encoder circuit receiving the detection result from the comparator circuit and scanning bi-directionally from head to tail or vice versa of the rows or columns of the lines to obtain the number of the selected row or column line, a plurality of bus lines constituting a bus being varied in voltage level depending upon the obtained number of the selected row or column line and encoding the voltage level in relation with the number; and a read-out circuit reading the voltage level of the bus lines from the encoder circuit to determine if the encoded number is identical with the number of the selected row or column line;

said liquid crystal display unit, said comparator circuit, said encoder circuit, and the read-out circuit being built in the same substrate as the liquid crystal display elements.

According to a third aspect of the invention, there is provided a method for testing a liquid crystal display device in which liquid crystal display elements are arranged in matrix, and thin film transistors have their respective drains connected to the liquid crystal display elements, their respective gates commonly connected to row lines, and their respective sources commonly connected to column lines, the transistors arranged in the same row sharing the line of that row, the transistors arranged in the same column sharing the line of that column, the rows of the lines being controlled by a row driver, and the columns of the lines being supplied with multi-level voltage depending upon gradation of a display image by a column driver; the method comprising the steps of detecting which of the rows or columns of the lines is selected, with reference to the detection result in the step of detecting, scanning bi-directionally from head to tail or vice versa of the rows or columns of the lines to specify the number of the selected row or column line, varying a plurality of bus lines in voltage level depending upon the specified number of the selected row or column line and encoding the voltage level in relation with the number, and reading the encoded voltage level of the bus lines to determine if the encoded number is identical with the number of the selected row or column line.

In accordance with the present invention, a test circuit of a simplified structure for testing a liquid crystal display device is provided in the same substrate as liquid crystal display elements, and hence, such a test circuit ensures to check states of wirings and operations of TFTs without visual inspections before filling of the liquid crystal.

Moreover, in a liquid crystal display device according to the present invention, liquid crystal display elements and a test circuit of a simplified structure are provided in the same substrate, and this ensures to check states of wirings and operations of TFTs without visual inspections before these components are embedded in liquid crystal, which eventually brings about a reduction of the manufacturing cost and effectively avoids an increase in the required area for the test circuit.

Furthermore, since a test method for a liquid crystal display device according to the present invention includes the steps of detecting selected row or column line, scanning bi-directionally from top to bottom or vise versa of the rows or column lines to obtain the line number of the selected one of the rows or column lines, encoding a voltage level at a batch of bus lines that constitute a bus so as to be related to the detected number of the selected row or column line, and detecting if the encoded number on the batch of bus lines is identical with the number of the selected row or column line obtained as a result of the bi-directional scanning, so as to produce a signal indicating the number, and therefore, operations of TFTs and states of wirings can be checked without using an external test device even before the components are embedded in the liquid crystal.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Embodiments of the present invention will now be described in detail with reference to the accompanying drawings.

Figure 1:
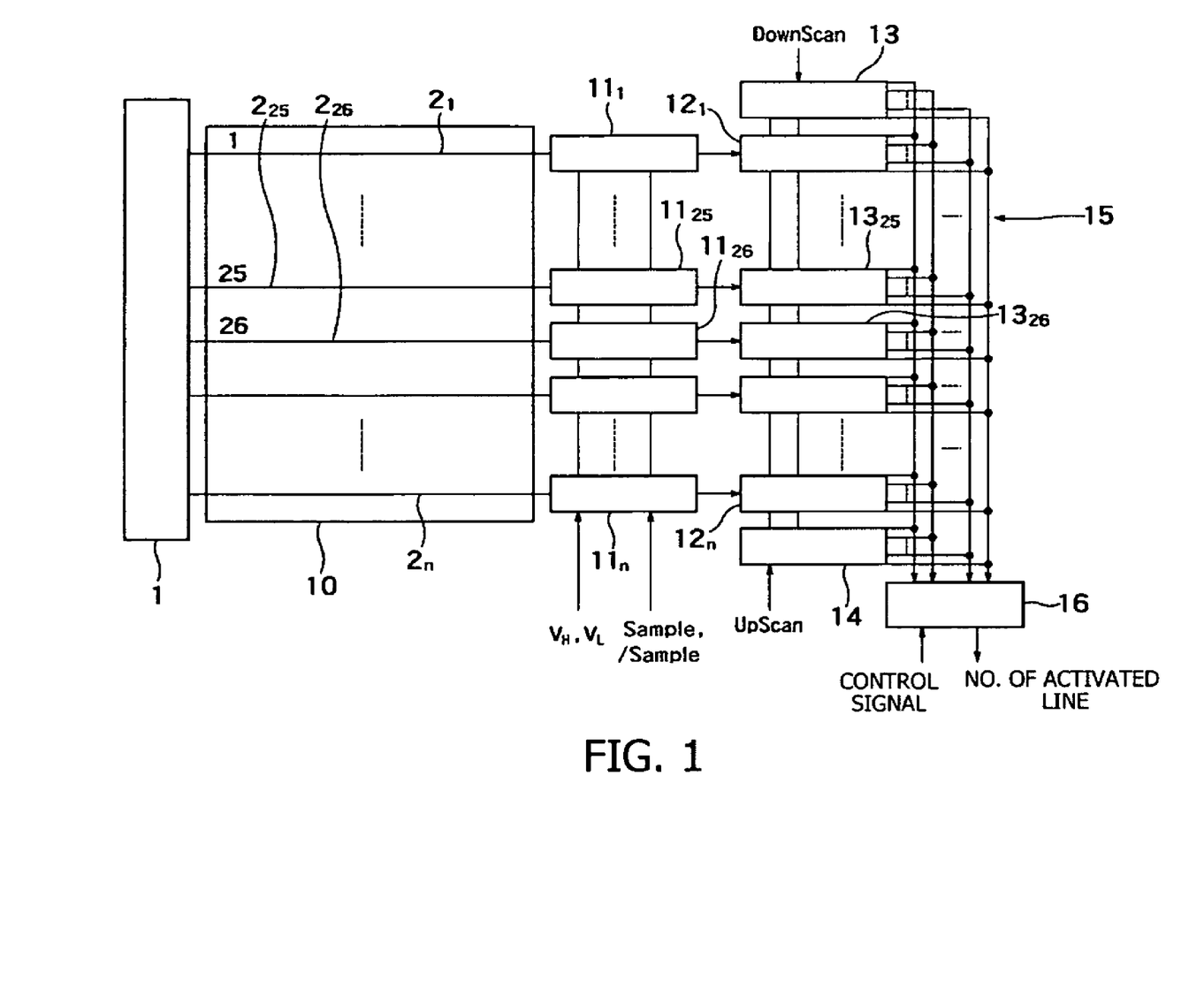
FIG. 1 is a schematic block diagram showing the entire structure of a test circuit incorporated liquid crystal display device according to the present invention.

FIG. 1 is a schematic block diagram showing a configuration of a liquid crystal display device incorporated with a liquid crystal display device test circuit, and all of the components shown herein are formed in the identical substrate.

Examples detailed below represent some configuration suitable to test row lines.

A liquid crystal display device 10 includes, as well known in the art, liquid crystal display elements arranged in matrix form, with each having its pixel electrode connected to a drain of a thin film transistor (TFT). The TFTs arranged in rows share row lines $2_1$ to $2_n$, having their respective gates commonly connected to these lines, and a selection from the row lines $2_1$ to $2_n$ is performed by a row driver 1. The row driver 1 produces signals of two levels, namely, select and non-select, to the row line(s) that are to be activated for display.

On the other hand, not shown in the drawings for simplification but well known in the art, the TFTs arranged in columns share column lines, have their respective sources commonly connected to these lines. Levels of voltage corresponding to the brightness of the display pixels are produced to the column lines by a column driver, and they are written in the associated pixel electrodes through the TFTs. In this way, transmissivity of liquid crystal is varied to attain an image with gradation.

An operation where the row lines are selected will be described below.

In FIG. 1, part depicted on the right of the liquid crystal display 10 is a liquid crystal display test circuit according to the present invention.

Comparators $11_1$ to $11_n$ are connected to the row lines $2_1$ to $2_n$, respectively, and outputs from the comparators $11_1$ to $11_n$ are applied to encoders $12_1$ to $12_n$, respectively. A top dummy encoder 13 arranged in the upper side of the encoders $12_1$ to $12_n$ in stack while a bottom dummy encoder 14 arranged in the lower side of them. These encoders share a read-out bus 15 in producing their respective outputs to a read-out interface 16 from which produced are the numbers of lines that are to be activated.

Figure 2:
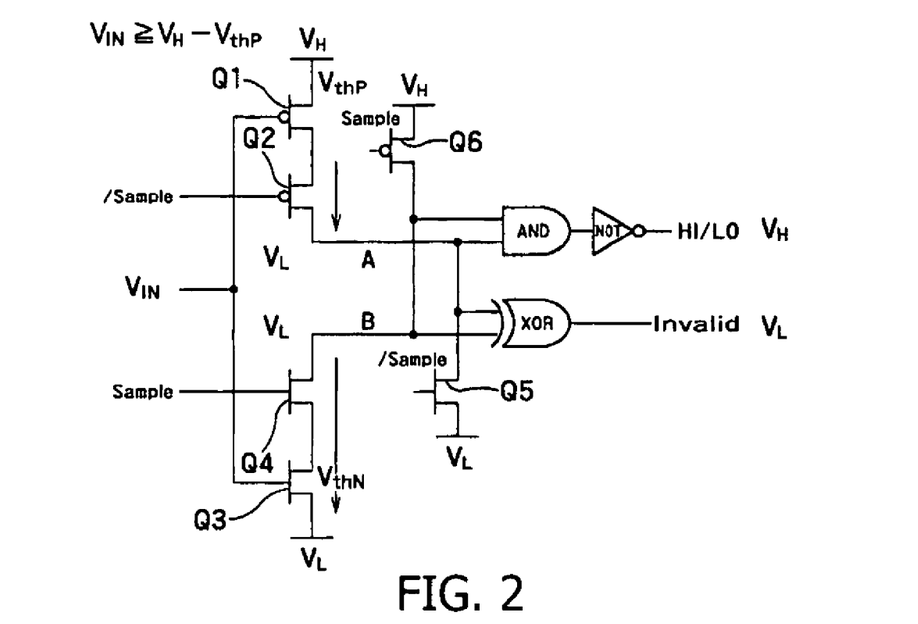
FIG. 2 is a circuit diagram illustrating an exemplary configuration of a comparator and an operation of the same upon receiving a High level signal.
Figure 3:
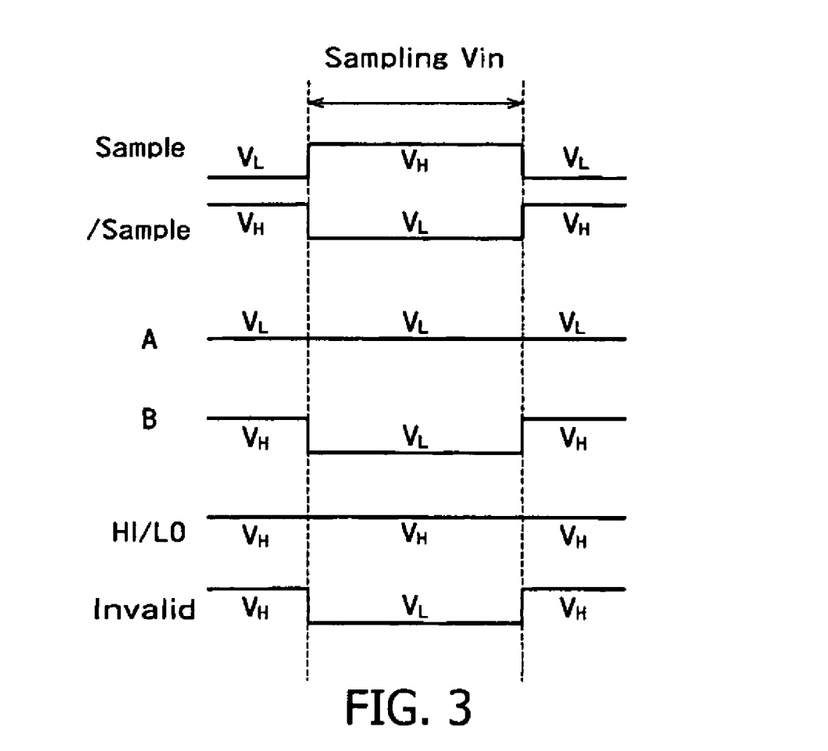
FIG. 3 is a timing chart illustrating the operation in FIG. 2.
Figure 4:
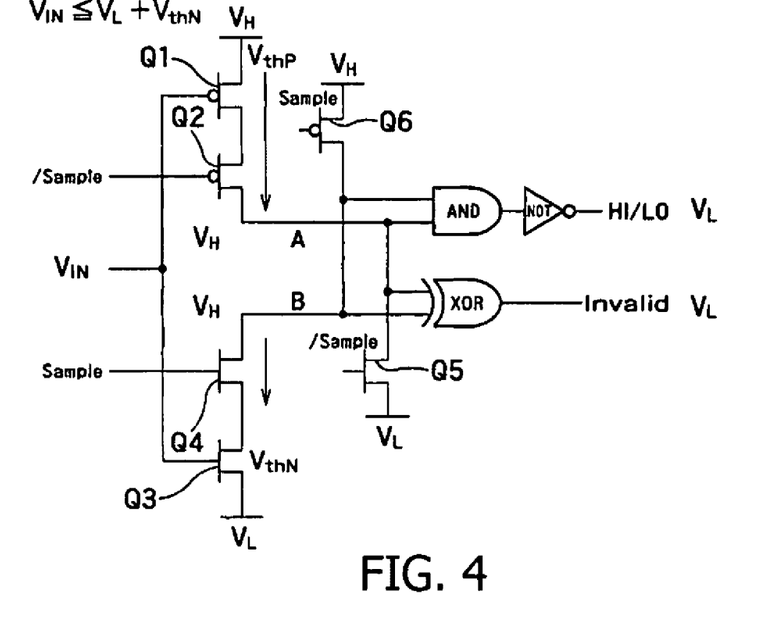
FIG. 4 is a circuit diagram showing an operation of the comparator configured as in FIG. 2 upon receiving a Low level signal.
Figure 5:
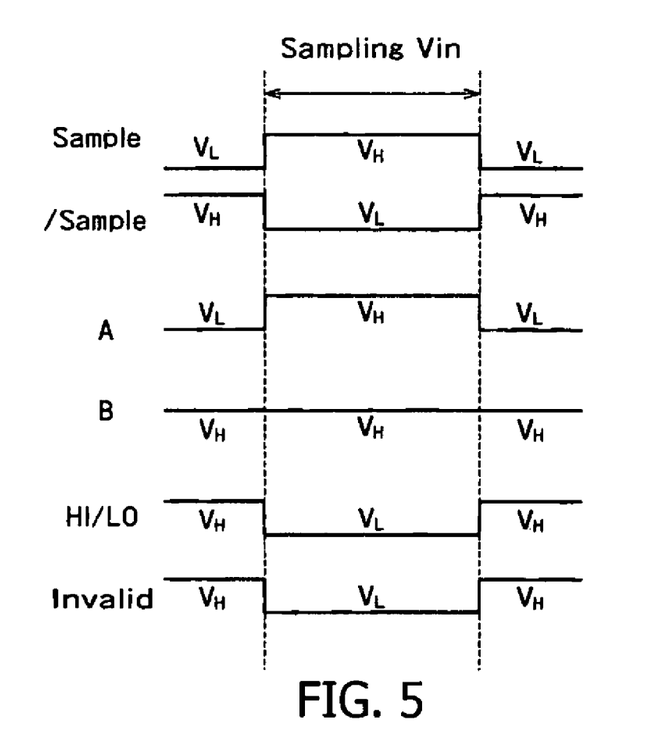
FIG. 5 is a timing chart illustrating the operation in FIG. 4.
Figure 6:
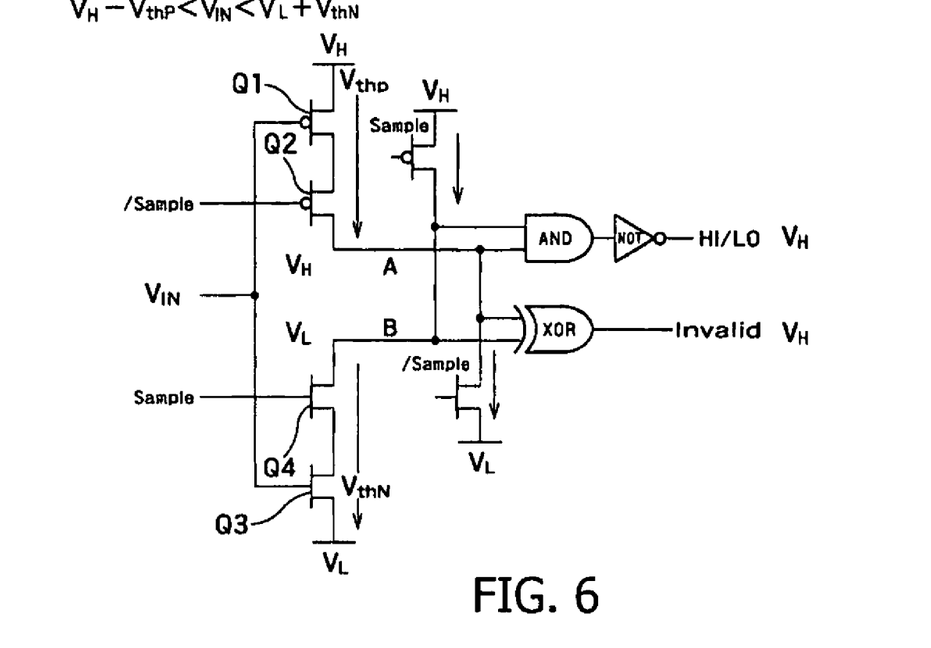
FIG. 6 is a circuit diagram showing an operation of the comparator configured as in FIG. 2 upon receiving an invalid intermediate level signal.
Figure 7:
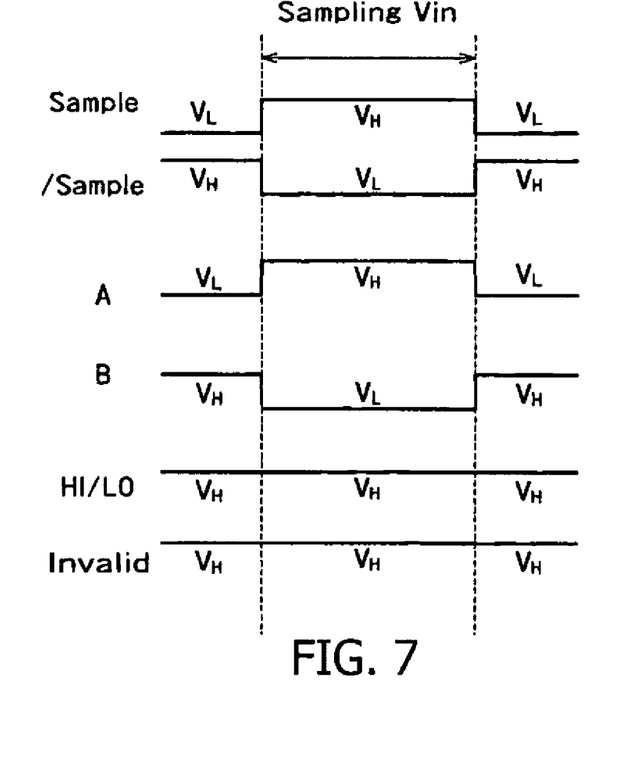
FIG. 7 is a timing chart illustrating the operation in FIG. 6.

FIGS. 2, 4 and 6 show a configuration of the comparators $11_1$ to $11_n$ and a determination procedure in the same while FIGS. 3, 5 and 7 are timing charts illustrating logic variations depending on the determination operation.

In these comparators, there are provided transistors Q1 and Q2 in series where the transistor Q1 has an inverting gate supplied with input voltage $V_{IN}$ and has a threshold voltage of $V_{thP}$ while the transistor Q2 has an inverting gate supplied with an inverted sample signal. The couple of the transistors have their one terminal point connected to a high voltage $V_H$ and the other terminal point or an associated node A connected to one input of an AND gate and one input of an exclusive OR (XOR) gate. Between the node A and a low voltage VL, there is provided a transistor Q5 having a gate supplied with an inverted sample signal, so as to ensure initializing the node A with a low level.

On the other hand, transistors Q3 and Q4 are connected in series, and the transistor Q3 has its gate supplied with the input voltage $V_{IN}$ and has a threshold value of $V_{thN}$ while the transistor Q4 has its gate supplied with a sample signal. The couple of the transistors Q3 and Q4 have their one terminal point connected to a low voltage $V_L$ and the other terminal point or an associated node B connected to the other input of the AND gate and the other input of the exclusive OR (XOR) gate. Between the node B and the high voltage $V_H$, there is provided a transistor Q6 having its gate supplied with an inverted sample signal, so as to ensure initializing the node B with a high level.

An output of the AND gate is connected to an inverting circuit of which output is a HI/LO signal indicating whether an output signal from the AND gate is at high level or low level, and an output signal from the XOR gate becomes invalid.

The comparator circuit 11 uses two reference levels for inversion of input signals to determine which of the three levels the inverted input signals reach. Specifically, a potential level higher or sufficiently higher than the threshold value $V_{thP}$ decreased from the high voltage $V_H$ ($V_H-V_{thP}$) is deemed to be High, a potential level lower or sufficiently lower than the threshold value $V_{thN}$ raised from the low voltage $V_L$ ($V_L+V_{thN}$) is deemed to be Low, and an intermediate level is judged as being Invalid. In this way, excluding an event where the signal of such an intermediate and therefore unstable level appears in the rows and column lines, only the signals at sufficiently high or sufficient low level can be utilized.

An operation to produce comparator outputs depending upon the levels of the input signals will be described on the case-by-case basis. It is now assumed that during the judgment, applied to the related gates are the sample signal Sample that is High in level and the inverted sample signal/Sample that is Low.

First, referring to FIGS. 2 and 3, a case where the level of the input signal is greater than $V_H-V_{thP}$ will be described.

In this case, the transistor Q2 is turned on while the transistor Q1 is not, and therefore the node A keeps Low in voltage level. The transistors Q3 and Q4, however, are turned on, and hence, the node B turns to Low. Thus, as a result of logic operations, the HI/LO output signal is High while the Invalid output signal is Low, and therefore, it is determined that the input signal is a valid High signal.

Next, with reference to FIGS. 4 and 5, another case where the input signal level is smaller than $V_L+V_{thN}$ will be described.

In this case, the transistors Q1, Q2 and Q4 are turned on, and the nodes A and B are turned to High. Hence, the HI/LO output signal is Low while the Invalid output signal is Low, and therefore, it is determined that the input signal is a valid Low signal.

Furthermore, still another case where the input signal level is greater than $V_L+V_{thN}$ and smaller than $V_H-V_{thP}$ will be described in conjunction with FIGS. 6 and 7.

In this case, all the transistors Q1 to Q4 are turned on, and the node A is inverted to High while the node B is to Low. Thus, the HI/LO output signal is High while the Invalid output signal is High in level, and therefore, it is determined that the input signal is of an invalid level.

As has been described, the comparator circuit 11 is capable of assuredly judging the three levels of High, Low, and Invalid, depending upon the level of the input signals, to transfer the results to an encoder circuit in the subsequent state.

Figure 8:
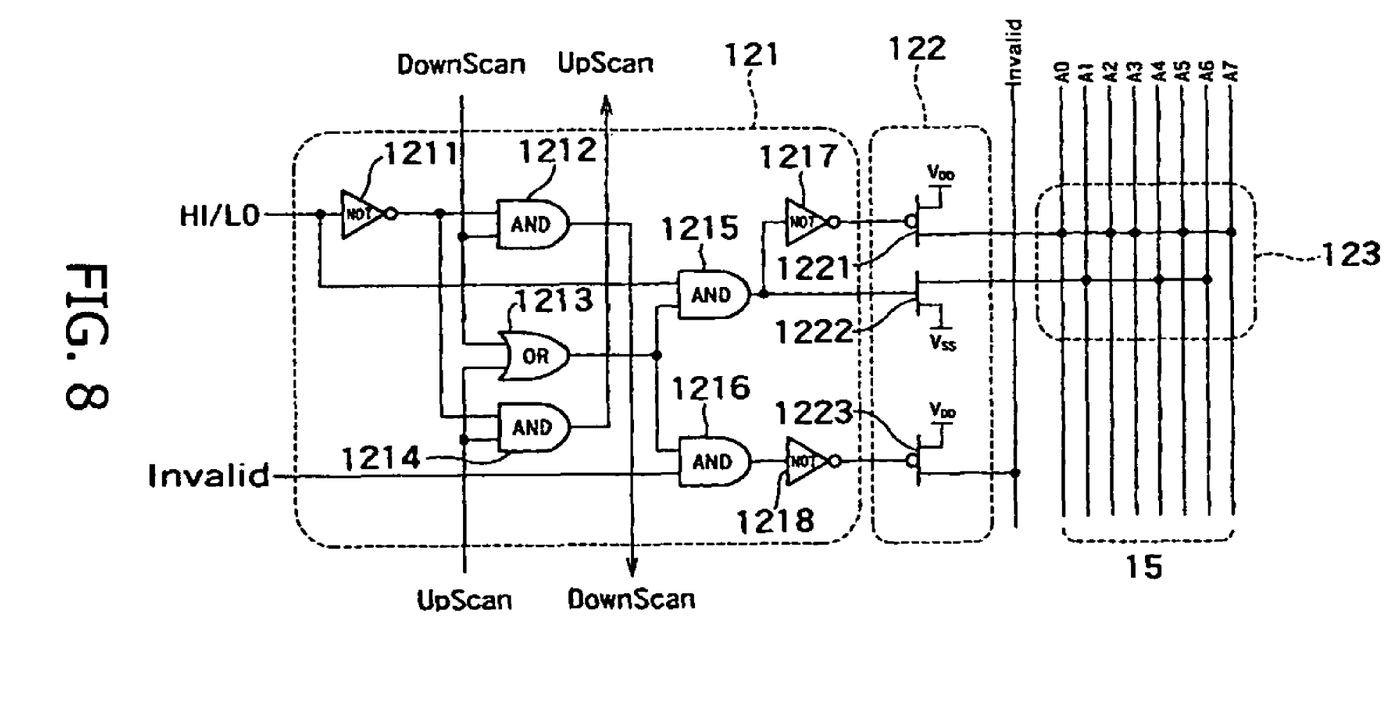
FIG. 8 is a circuit diagram showing an exemplary configuration of an encoder.

FIG. 8 is a circuit diagram showing a configuration of an encoder circuit 12. The encoder circuit 12 employs a so-called "encyclical style" in encoding the numbers of rows only when a Down Scan signal from an encoder of a leading or upper row, or a Up Scan signal from an encoder of a trailing or lower row is High in level.

The encoder circuit 12 has three parts, namely, a scan control logic circuitry 121, a line buffer 122, and a hardwire encoding unit 123.

In the scan control logic circuitry 121, the HI/LO output from the comparator is supplied to an inverter 1211 and an AND gate 1215, respectively. The inverter 1211 produces an output signal to AND gates 1212 and 1214, respectively. On the other hand, since the Down Scan signal from the encoder of an upper row is supplied to the AND gate 1212, an output from the AND gate 1212 is transferred as the Down Scan signal to the encoder of a succeeding lower row. Specifically, when the output from the comparator is Low, the AND gate receiving the Down Scan signal behaves to send the Down Scan signal to the encoder of the succeeding lower row. Contrary to this, when the output from the comparator is High, the Down Scan signal to the succeeding lower row would not be produced.

Similarly, since the Up Scan signal from the lower row is supplied to the AND gate 1214, the AND gate 1214, receiving the Up Scan signal when the output from the comparator is Low, produces the Up Scan signal to the leading or upper row.

The Down Scan signal from the upper row and the Up Scan signal from the lower row are applied to the OR gate 1213, and the OR gate 1213 produces output signals to the remaining input terminals of the AND gates 1215 and 1216.

The AND gate 1215 generates an encoding signal when the output from the comparator is High and either the Down Scan signal or the Up Scan signal is High. The encoding signal causes a transistor 1222 in the line buffer 122 to turn on, and resultantly potentials at lines A1, A4 and A6 in the read-out bus and connected to the transistor is decreased down to a potential level $V_{SS}$. An inverter 1217 inverts the output from the AND gate 1215 to produce an inverted signal to a gate of a transistor 1221 having its one terminal connected to $V_{DD}$, and hence, potentials at lines A0, A2, A3, A5 and A7 connected to the other terminal of the transistor 1221 are raised up to the voltage level $V_{DD}$. The hardwire encoder 123 are connected in advance to $V_{DD}$ and $V_{SS}$ depending upon the row number designated to the selected row line. In this case, the row number decoded as the bus number is 10110101 (i.e., 181 in decimal number).

An invalid signal from the comparator is applied to the remaining input terminal of the AND gate 1216, and hence, an inverter 1218 inverts an output signal from the AND gate 1216 when the invalid signal is High in level and the Down Scan signal or the Up Scan signal is High. The inverted signal from the transistor 1223 is transferred to a gate of a transistor 1223 having its one terminal connected to $V_{DD}$, and an invalid signal line connected to the other terminal of the transistor turns to High, which leads to a determination that the output from the comparator is invalid. In this case, also, the decoded signal about the bus lines related with the row number can be obtained when a High/Low signal from the comparator is High, so as to let the user know which lines the output signal from the comparator becomes invalid in. Simultaneously, when the High/Low signal output from the comparator is High, the Up Scan signal and the Down Scan signal are prevented from being transferred to the next line.

In the circuit 12, as has been described, upon receiving a valid High signal from the comparator 11, an output representing the row number is produced in the read-out bus, and if the output from the comparator is not High, the received Up Scan signal or the received Down Scan signal is transferred to the subsequent row. When the output from the comparator is invalid, the Invalid signal line is activated.

In this concept of the circuit, the presence of the Up Scan signal or the Down Scan signal is presumed, and signal processing in the uppermost or lowermost encoder will be a matter of interest. In order to implement a satisfactory arrangement, proposed below will be a top dummy encoder depicted in the uppermost position in FIG. 9 and a bottom dummy encoder depicted in the lowermost position in FIG. 10.

Figure 9:
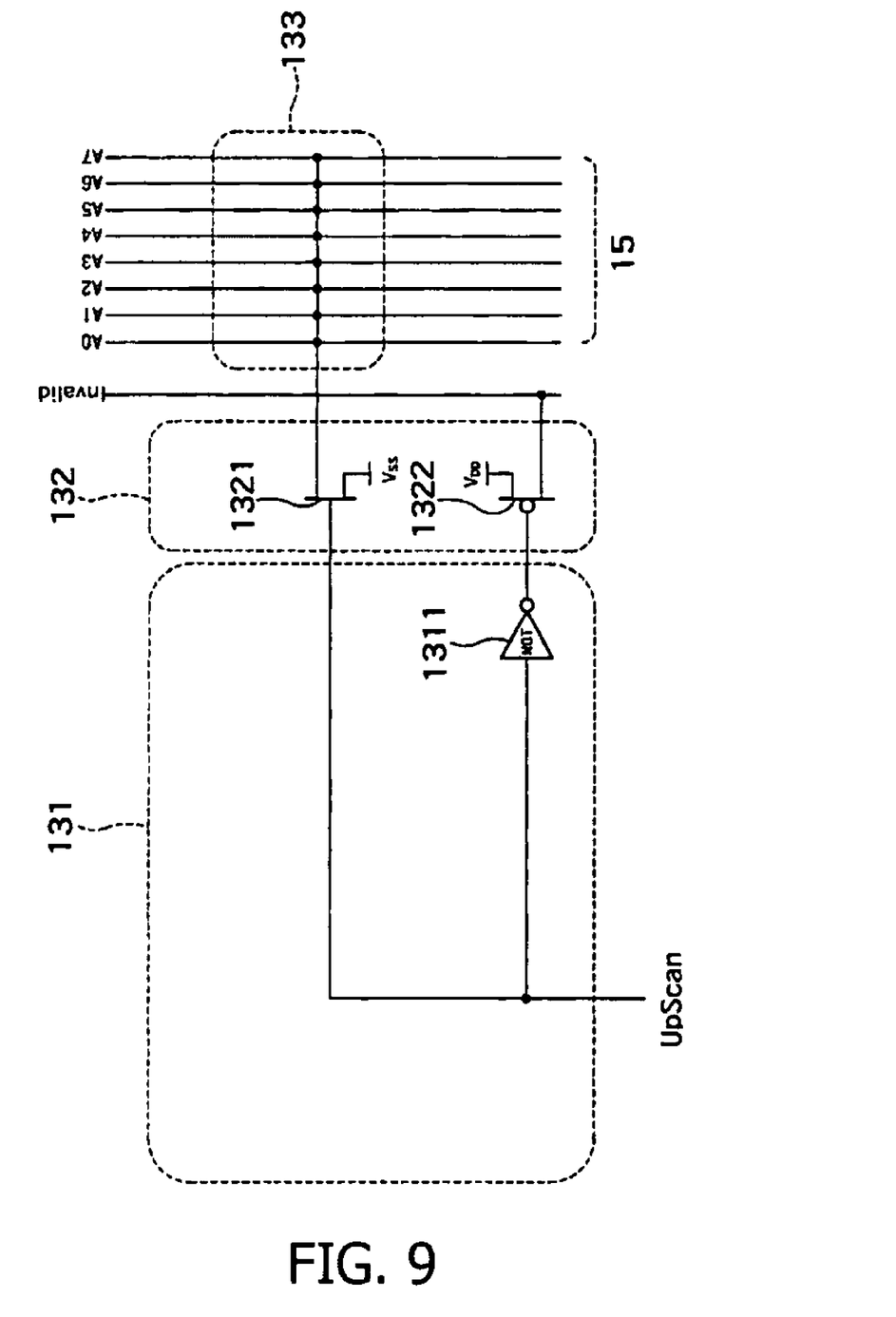
FIG. 9 is a circuit diagram showing an exemplary configuration of a top dummy encoder.

The top dummy encoder 13 shown in FIG. 9 also includes a scan control logic circuitry 131, a line buffer 132, and a hardwire encoder 133, but since this encoder is a dummy, no output from the comparator is applied to it. No Down Scan signal is generated in this encoder.

In the scan control logic circuitry 131, the Up Scan signal is applied to a line of a lower row first, and this signal is directly passed to the line buffer 132 to make a transistor 1321 turn on, which results in all the read-out bus lines connected thereto being decreased in potential level down to $V_{SS}$. Thus, the decoded row number as the numbers of the bus lines are 00000000 (0 in decimal number).

An inverter 1311 in the scan control logic circuitry 131 inverts the Up Scan signal, and the inverted signal is transferred to a gate of a transistor 1223 having its one terminal connected to $V_{DD}$. Thus, a High signal is produced to an Invalid signal line connected to the remaining input terminal of the transistor 1223, and this clarifies that the dummy encoder does not produce the number of the row line unlike the ordinary encoders.

Figure 10:
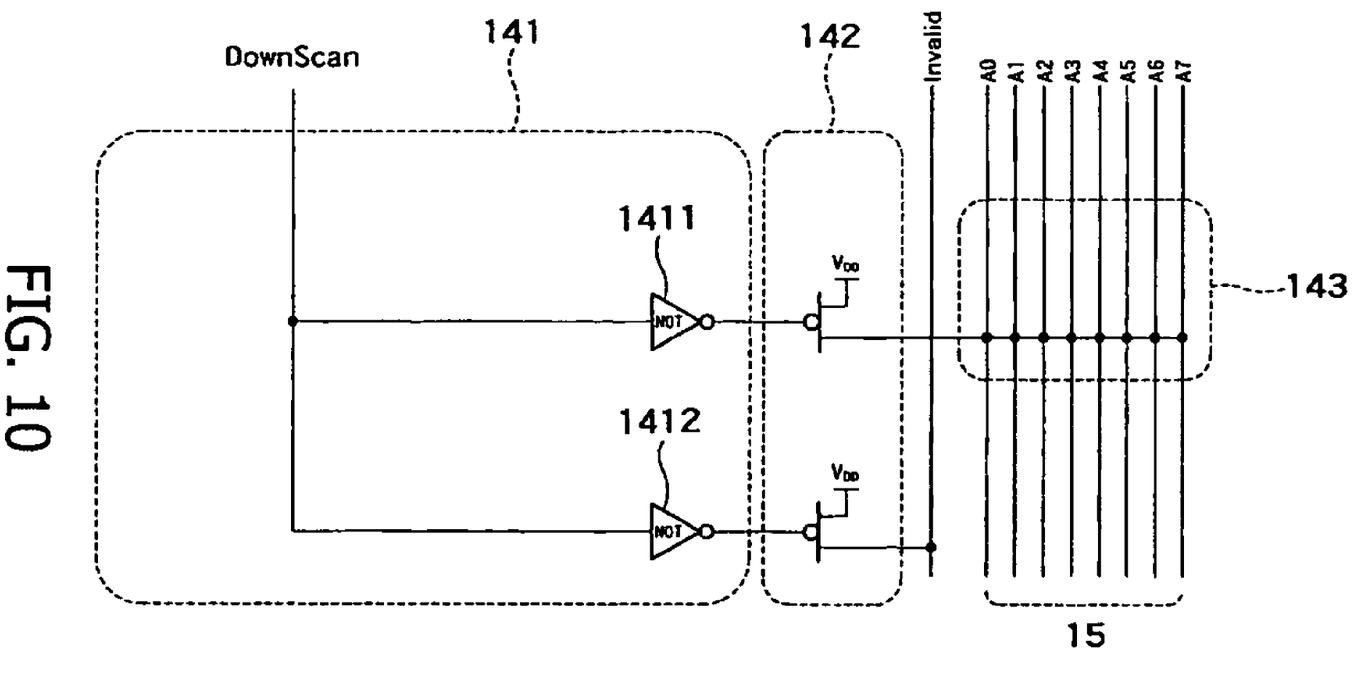
FIG. 10 is a circuit diagram showing an exemplary configuration of a bottom dummy encoder.

The bottom dummy encoder shown in FIG. 10 has a similar configuration to that of the top dummy encoder shown in FIG. 9, and branch lines in a scan control logic circuitry 141 let the Down Scan signal applied thereto pass to inverters 1411 and 1412, and the signals inverted in the inverters are respectively transferred to gates of transistors 1421 and 1422 in a line buffer 142. These transistors have their respective ones of terminals connected to $V_{DD}$, and the transistor 1421 is turned on to raise a voltage level at the signal lines connected to the other terminal up to $V_{DD}$ while the transistor 1422 is turned on to turn the invalid line to High in voltage level. In this way, the number of the row line decoded as the numbers of the bus lines are 11111111 (255 in decimal number), and this clarifies that the dummy encoder does not produce the number of the row line unlike the ordinary encoders.

Figure 11:
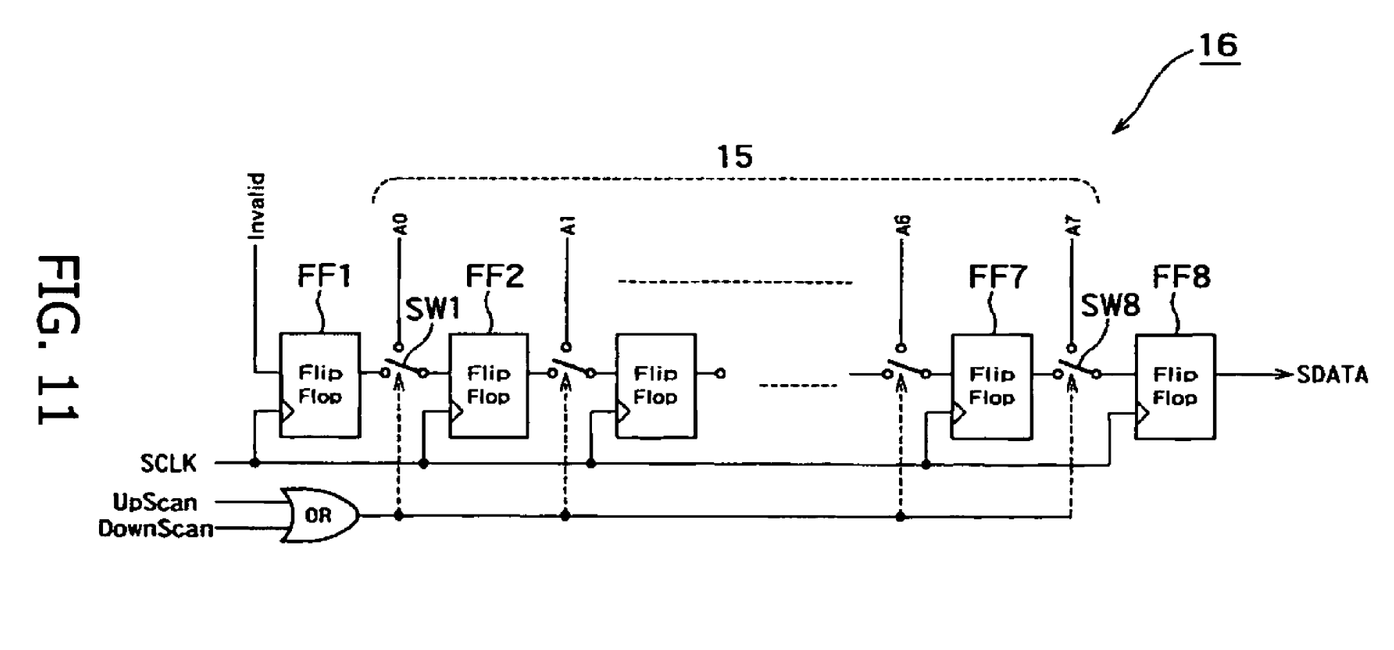
FIG. 11 is a circuit diagram showing an exemplary configuration of a read-out interface.

FIG. 11 depicts a configuration of the interface 16. In this circuit, there are nine flip flops FF1 to FF8 that receive a scan clock signal SCLK in synchronization with a clock, and FF1 has its data terminal connected to the Invalid signal line. An output terminal of the FF1 or the read-out bus line A0 is selected by a switch SW1, and either of them is connected to a data input terminal of FF1. The remaining flip flops and bus lines are connected in the similar manner, and the last one of the flip flops, FF8, has its input terminal connected to either of an output of FF7 in the previous stage or the read-out bus line A7 which is selected by a switch SW8. The switches SW1 to SW8 are connected to the read-out buses during the first half of each row line reading cycle for either the up scanning or the down scanning so as to store the state of each bus line, namely, High or Low, in the related flip flop, and each of the switches is connected to the output of the flip flop in the previous stage during the latter half of the reading cycle, so as to serve as a shift register, thereby eventually producing SDATA containing serial data on the number of the activated row and column lines as a result of sequential outputs and relays.

The SDATA is to be obtained for both the down scanning and the up scanning and then analyzed through a comparison of two of the results to judge pass or fail of the product.

Figure 12:
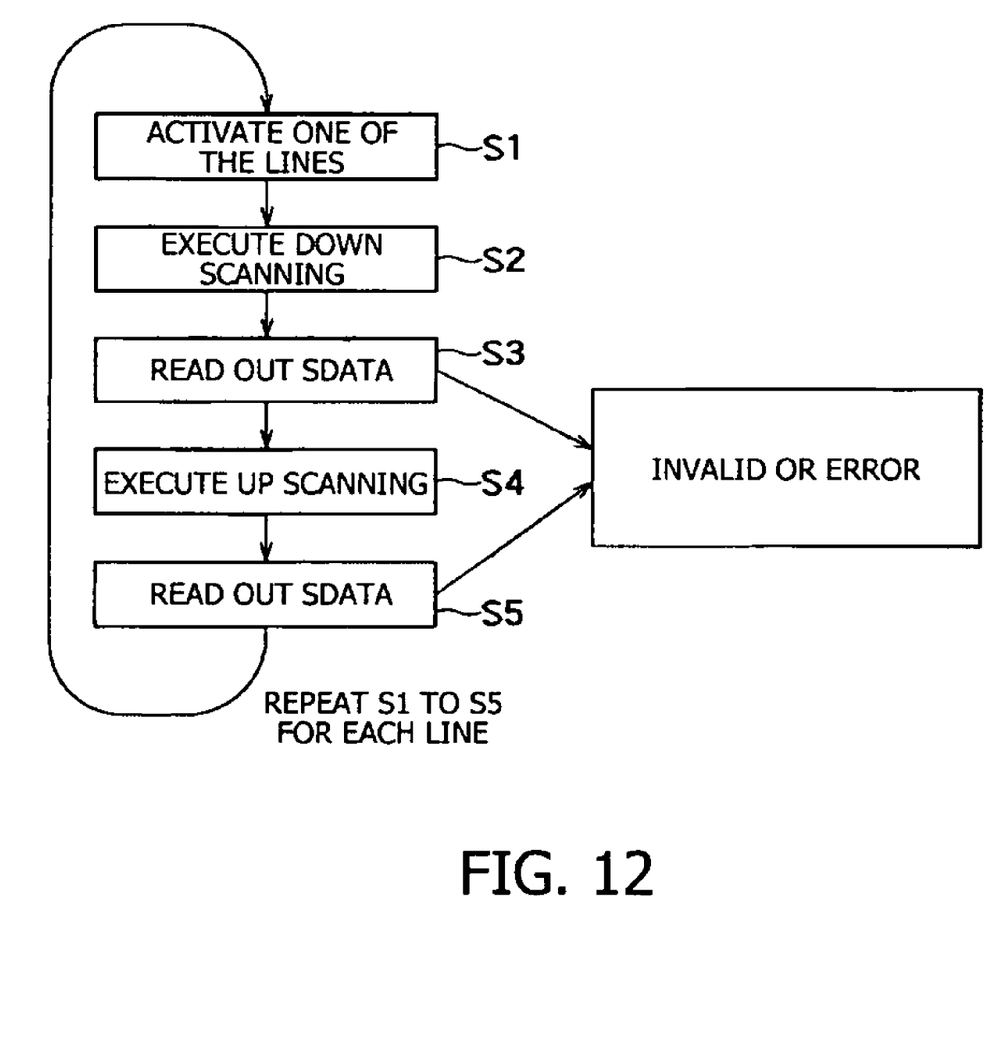
FIG. 12 is a flow chart schematically illustrating a test procedure on the liquid crystal display device, using the test circuit according to the present invention.

FIG. 12 is a flow chart simply illustrating the aforementioned procedure. First, one of the lines (in rows) is activated (Step S1), and the down scanning is carried out (Step S2) to obtain SDATA (Step S3). For instance, executing the down scanning with the line of the third row being activated, SDATA indicating that the third row is being activated can be obtained if the device is in normal condition.

Then, the up scanning is carried out (Step S4) to produce SDATA (Step S5). In this case, also, the device in normal condition eventually produces SDATA indicating that the third row is being activated. If the data SDATA obtained at Steps S3 and S5 are not identical with each other, or if the invalid signal is produced, the detection gives a result of error.

An actual procedure for such an error detection will be described, returning to FIG. 1.

Above all, it is assumed that no particular abnormality occurs in the device, and the row driver 1 selects the line of the $26^{th}$ row. First, the down scanning is initiated from the top dummy encoder sequentially through the succeedingly upper rows till the $26^{th}$ row in which the comparator $11_{26}$ produces a High signal. This state of the signal activates the encoder $12_{26}$, and the hardwire encoder produces a sequence of data consisting of 1 for High level and 0 for Low level, and resultantly, passed to the read-out bus is a sequence of binary numbers of 00011010 or 26 in decimal manner. The binary data is produced from the read-out interface 16.

Then, the up scanning is initiated from the bottom dummy encoder sequentially through the succeedingly lower rows till the $26^{th}$ row in which the comparator $11_{26}$ produces a High signal. This state of the signal permits the read-out interface 16 to produce a sequence of binary data of 00011010. This binary number is identical to the resultant data from the down scanning, and therefore, it is judged that the line of the $26^{th}$ row is normal.

Next, it is assumed that the line of the $26^{th}$ row is selected similar to the previous case but with some abnormality that the output from the comparator is passed to the line of the $25^{th}$ row independent of the selection of the line.

As has been described, the down scanning is initiated from the top dummy encoder sequentially through the succeedingly upper rows till the $25^{th}$ row in which the comparator $11_{25}$ produces a High signal. This state of the signal activates the encoder $12_{25}$, and the hardwire encoder produces a sequence of binary data consisting of 1 for High level and 0 for Low level, and resultantly, passed to the read-out bus is a sequence of binary numbers of 00011001 or 25 in decimal manner. The binary data is produced from the read-out interface 16.

Then, the up scanning is initiated from the bottom dummy encoder sequentially through the succeedingly lower rows till the $26^{th}$ row in which the comparator $11_{26}$ produces a High signal. This state of the signal permits the read-out interface 16 to produce a sequence of binary data of 00011010. This binary number is identical to the resultant data from the down scanning, and therefore, it is judged that the line of the $26^{th}$ row is normal.

In this situation, two of the read-out data are not identical, and thus, given is a judgment of "abnormal".

Additionally, when it is contradictorily found that no row line is selected despite the fact that the row driver 1 has selected one, an attempt to execute the down scanning results in the bottom dummy decoder generating a sequence of binary numbers of 11111111 or 256 in decimal manner, which leads to a judgment of "abnormal". As a result of the up scanning, the top dummy encoder produces a sequence of binary numbers of 00000000 or 0 in decimal manner, and this also leads to a judgment of "abnormal".

As has been described, in accordance with the present invention, a simplified test circuit is built in the same substrate as the liquid crystal display elements, and this ensures to check states of wirings and operations of TFTs without visual inspections even before these components are embedded in liquid crystal. In this case, the test circuit that is to be built in is simplified in structure and occupies a smaller area in comparison with a driver, that is, the required area for the test circuit is not so much as taking up the effective area of the liquid crystal display device, as a whole.

The circuitries described above are by way of examples only, and any person skilled in the art will be able to envision other circuit configurations that can attain the similar functions, from their knowledge of the state of the art.

For example, although the test is carried out handling the row lines as base units in the aforementioned embodiments, the base unit may be replaced with the column lines among which any particular one is to be selected by a column driver to undergo the inspections on the above-mentioned test circuit provided therein for detecting abnormality. In such a case, typically, analog signals of multi-levels are applied to the column lines depending upon the brightness of the pixels, but in the test method according to the present invention, since a comparator circuit merely functions to judge if the selected line is activated, the column driver may produce simply two levels of voltage, namely, High and Low, to the selected column.

The test circuits may be provided for both the rows and columns of the lines to make the inspections perfect.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A test device for a liquid crystal display device in which a liquid crystal display unit has liquid crystal display elements arranged in matrix, and thin film transistors have their respective drains connected to the liquid crystal display elements, their respective gates commonly connected to row lines, and their respective sources commonly connected to column lines, the transistors arranged in the same row sharing the line of that row, the transistors arranged in the same column sharing the line of that column, the rows of the lines being controlled by a row driver, and the columns of the lines being supplied with multi-level voltage depending upon gradation of a display image by a column driver, the test device comprising:
a comparator circuit provided in each of either the rows or columns of the lines for detecting which of the rows or columns of the lines is selected;
an encoder circuit receiving the detection result from the comparator circuit and scanning bi-directionally from head to tail or vice versa of the rows or columns of the lines to obtain the number of the selected row or column line, a plurality of bus lines constituting a bus being varied in voltage level depending upon the obtained number of the selected row or column line and encoding the voltage level in relation with the number; and
a read-out circuit reading the voltage level of the bus lines from the encoder circuit to determine if the encoded number is identical with the number of the selected row or column line,
wherein said comparator circuit, said encoder circuit, and said read-out circuit being built in the same substrate as the liquid crystal display elements.

2. The test circuit for a liquid crystal display device according to claim 1, wherein the comparator circuit produces a signal of high level when an input signal is sufficiently high in level, produces a signal of low level when the input signal is sufficiently low in level, and produces an invalid signal when the input signal is of intermediate level.

3. The test circuit for a liquid crystal display device according to claim 2, wherein the comparator circuit utilizes a first threshold value of a first transistor connected to a high potential to produces a signal of high level upon receiving input voltage at the level of the first threshold value decreased from the high potential, and utilizes a second threshold value of a second transistor connected to a low potential to produces a signal of low level upon receiving the input voltage at the level of the second threshold value raised from the low potential.

4. The test circuit for a liquid crystal display device according to claim 1, wherein the encoder circuit includes a hardwire junction that produces, to the bus lines, a signal of a voltage level corresponding to a binary representation of the number of the selected row or column line.

5. The test circuit for a liquid crystal display device according to claim 1, wherein the encoder circuit includes a down scan signal generating circuit and an up scan signal generating circuit; and
during bi-directionally scanning from top to tail or vice versa of the rows or columns of the lines, the down scan signal generating circuit sends a down scan signal to the line of the succeeding lower row or column when the encoder circuit cannot receive the detection result from the comparator circuit upon receiving the down scan signal from the line of the previous upper row or column, and
during the same scanning procedure, the up scan signal generating circuit sends an up scan signal to the line of the succeeding upper row or column when the encoder circuit cannot receive the detection result from the comparator circuit upon receiving the up scan signal from the line of the previous lower row or column.

6. The test circuit for a liquid crystal display device according to claim 1, wherein the encoder circuit has a top dummy encoder and a bottom dummy encoder at its leading or uppermost position and its trailing or lowermost position, respectively; and when it is instructed to execute the scanning although no line is selected from both the rows and columns, the top and bottom dummy encoders encode the voltage level of the bus lines as numeral representations denoting two extreme positions of the rows or columns.

7. A liquid crystal display device, comprising:

a liquid crystal display unit including liquid crystal display elements arranged in matrix, thin film transistors having their respective drains connected to the liquid crystal display elements, row lines commonly connected to gates the thin film transistors, and column lines commonly connected to sources of the thin film transistors, the transistors arranged in the same row sharing the line of that row, the transistors arranged in the same column sharing the line of that column, the rows of the lines being controlled by a row driver, and the columns of the lines being supplied with multi-level voltage depending upon gradation of a display image by a column driver;

a comparator circuit provided in each of either the rows or columns of the lines for detecting which of the rows or columns of the lines is selected;

an encoder circuit receiving the detection result from the comparator circuit and scanning bi-directionally from head to tail or vice versa of the rows or columns of the lines to obtain the number of the selected row or column line, a plurality of bus lines constituting a bus being varied in voltage level depending upon the obtained number of the selected row or column line and encoding the voltage level in relation with the number; and a read-out circuit reading the voltage level of the bus lines from the encoder circuit to determine if the encoded number is identical with the number of the selected row or column line, wherein said liquid crystal display unit, said comparator circuit, said encoder circuit, and the read-out circuit being built in the same substrate as the liquid crystal display elements.

8. The liquid crystal display device according to claim 7, wherein the comparator circuit produces a signal of high level when an input signal is sufficiently high in level, produces a signal of low level when the input signal is sufficiently low in level, and produces an invalid signal when the input signal is of intermediate level.

9. The liquid crystal display device according to claim 8, wherein the comparator circuit utilizes a first threshold value of a first transistor connected to a high potential to produces a signal of high level upon receiving input voltage at the level of the first threshold value decreased from the high potential, and utilizes a second threshold value of a second transistor connected to a low potential to produces a signal of low level upon receiving the input voltage at the level of the second threshold value raised from the low potential.

10. The liquid crystal display device according to claim 7, wherein the encoder circuit includes a hardwire junction that produces, to the bus lines, a signal of a voltage level corresponding to a binary representation of the number of the selected row or column line.

11. The liquid crystal display device according to claim 7, wherein the encoder circuit includes a down scan signal generating circuit and an up scan signal generating circuit; and during bi-directionally scanning from top to tail or vice versa of the rows or columns of the lines, the down scan signal generating circuit sends a down scan signal to the line of the succeeding lower row or column when the encoder circuit cannot receive the detection result from the comparator circuit upon receiving the down scan signal from the line of the previous upper row or column, and during the same scanning procedure, the up scan signal generating circuit sends an up scan signal to the line of the succeeding upper row or column when the encoder circuit cannot receive the detection result from the comparator circuit upon receiving the up scan signal from the line of the previous lower row or column.

12. The liquid crystal display device according to claim 7, wherein the encoder circuit has a top dummy encoder and a bottom dummy encoder at its leading or uppermost position and its trailing or lowermost position, respectively; and when it is instructed to execute the scanning although no line is selected from both the rows and columns, the top and bottom dummy encoders encode the voltage level of the bus lines as numeral representations denoting two extreme positions of the rows or columns.

13. A method for testing a liquid crystal display device in which liquid crystal display elements are arranged in matrix, and thin film transistors have their respective drains connected to the liquid crystal display elements, their respective gates commonly connected to row lines, and their respective sources commonly connected to column lines, the transistors arranged in the same row sharing the line of that row, the transistors arranged in the same column sharing the line of that column, the rows of the lines being controlled by a row driver, and the columns of the lines being supplied with multi-level voltage depending upon gradation of a display image by a column driver; the method comprising the steps of:

detecting which of the rows or columns of the lines is selected;

with reference to the detection result in the step of detecting, scanning bi-directionally from head to tail or vice versa of the rows or columns of the lines to specify the number of the selected row or column line;

varying a plurality of bus lines in voltage level depending upon the specified number of the selected row or column line and encoding the voltage level in relation with the number; and reading the encoded voltage level of the bus lines to determine if the encoded number is identical with the number of the selected row or column line.

14. The method according to claim 13, wherein, in the step of detecting which of the rows or columns of the lines is selected, voltage of two levels, namely, High and Low, is applied to the sources of the thin film transistors by the column driver.

15. The method according to claim 13, wherein the step of specifying the number of the selected row or column line including sending a down scan signal to the line of the succeeding lower row or column when the detection result cannot be given upon receiving the down scan signal from the line of the previous upper row or column, and sending an up scan signal to the line of the succeeding upper row or column when the detection result cannot be given upon receiving the up scan signal from the line of the previous lower row or column.

16. The method according to claim 15, further comprising the step of encoding the voltage level of the bus lines as numeral representations denoting two extreme positions of the rows or columns when no line is selected from both the rows and columns.

* * * * *